C. A. PETERSON.
SPRING ATTACHMENT FOR AUTOMOBILE STEERING GEARS.
APPLICATION FILED AUG. 31, 1915.
1,164,013.
Patented Dec. 14, 1915.
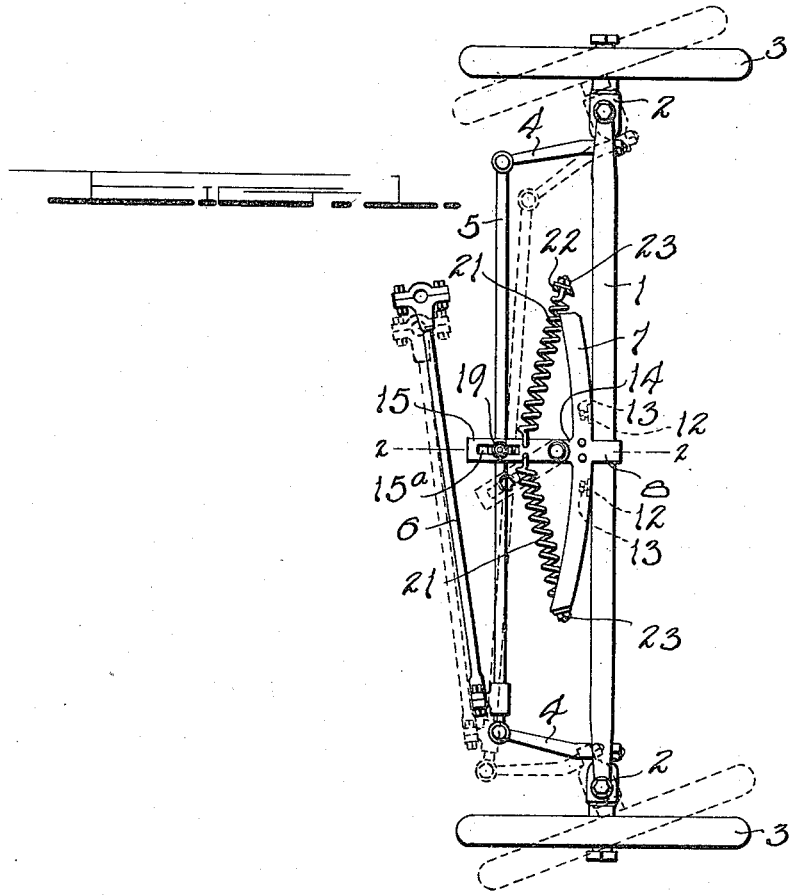
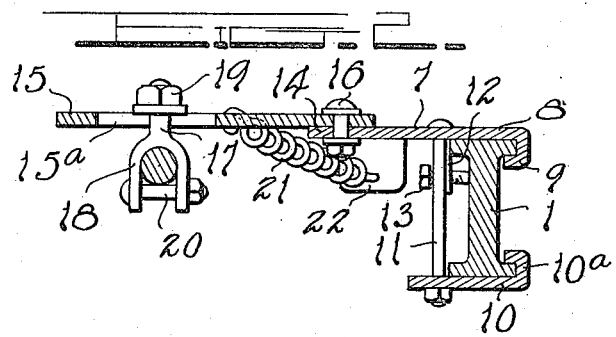
Inventor
C. A. PETERSON
By J. S. ....
Attorney

UNITED STATES PATENT OFFICE.

CARL A. PETERSON, OF STANHOPE, IOWA.

SPRING ATTACHMENT FOR AUTOMOBILE STEERING-GEARS.

1,164,013.

Specification of Letters Patent.

Patented Dec. 14, 1915.

Application filed August 31, 1915. Serial No. 48,313.

*To all whom it may concern:*

Be it known that I, CARL A. PETERSON, a citizen of the United States, residing at Stanhope, in the county of Hamilton, State of Iowa, have invented a new and useful Spring Attachment for Automobile Steering-Gears; and I do hereby declare the following to be a full, clear, and exact description of the invention, such as will enable others skilled in the art to which it appertains to make and use the same.

The present invention relates to a spring attachment for the steering gear of automobiles, and has for its object to provide a device of this character which embodies novel features of construction whereby the steering wheels are normally held yieldingly in alinement with the rear wheels, although they are free to be swung in either direction to steer the machine in the usual manner, such an attachment having the advantage of elminating the necessity for tightly gripping the steering wheels at all times, and thereby relieving much of the strain upon the driver.

Further objects of the invention are to provide a device of this character which is comparatively simple and inexpensive in its construction, which can be readily applied to an automobile without necessitating any alterations or changes in the construction thereof, which does not interfere with steering the automobile, and which will serve to compensate for any looseness in the steering gear.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which: —

Figure 1 is a top plan view of a spring attachment for an automobile steering gear constructed in accordance with the invention, showing the same as mounted upon the front axle. Fig. 2 is an enlarged vertical sectional view on the line 2—2 of Fig. 1.

Corresponding and like parts are referred to in the following description and indicated in all the views of the drawing by the same reference characters.

Specifically describing the present embodiment of the invention, the numeral 1 designates a front axle which is of the conventional construction and is provided at its ends with the spindle frames 2 upon which the front wheels 3 are mounted, said spindle frames being provided with the rearwardly projecting spindle arms 4 which have the extremities thereof joined by a spindle arm connecting rod 5. This connecting rod 5 is substantially parallel to the front axle 1, and is loosely connected at one end thereof to the steering gear connecting rod 6. Applied to the middle portion of the front axle 1 is a bowed plate or frame member 7, the back of the bowed frame 7 fitting against the front axle while the latererally projecting ends thereof are curved rearwardly away from the axle. An integral extension 8 projects forwardly from the back or middle portion of the bowed frame 7 and extends over the top of the axle 1, the extremity of the extension 8 being returned at 9 so as to fit around and engage the forward edge of the upper flange of the axle. A clamping plate 10 fits against the bottom of the axle 1 and is connected to the bowed frame 7 by means of clamping bolts 11 so as to coöperate with the extension 8 to grip the axle and retain the bowed frame in position thereon. The forward end of the coöperating clamping plate 10 is returned at $10^a$ so as to fit around and engage the forward edge of the lower flange of the axle. The clamping bolts 11 are arranged at the rear of the front axle and after these bolts have been tightened the bowed frame is held securely against accidental displacement.

Projecting downwardly from the rear edges of the bowed frame or plate 7 at intermediate points between the free ends thereof and the middle portion thereof are wings 12 which have set screws 13 threaded therein, said set screws being adapted to engage the rear face of the axle 1 and coöperate therewith to prevent the bowed frame from rocking or swinging laterally when the device is in action. It is also possible by adjusting the set screws 13 to slightly shift the position of the bowed frame for the purpose of equalizing the tension in the two springs when the front wheels are in alinement with the rear wheels.

Projecting rearwardly from the middle portion of the bowed frame 7 is an ear 14 which is disposed directly opposite the before mentioned integral extension 8 and has the swinging arm 15 connected thereto by means of a suitable pivot bolt 16. The rear end of the swinging arm 15 is formed with a longitudinal slot 15ª which loosely receives a pin 17 projecting upwardly from a forked clip 18 which is rigidly clamped upon the spindle arm connecting rod 5. The upper end of the pin 17 is shown as provided with a nut 19 which prevents the slotted rear end of the swinging arm 15 from becoming disengaged from the pin. The forked clip 18 straddles the spindle arm connecting rod 5 and the arms thereof are connected by a clamping bolt 20. After the forked clip has been properly positioned upon the connecting rod 5 the clamping bolt 20 is tightened so as to cause the clip to grip the connecting rod and be securely held in position thereon.

The swinging arm 15 is connected to the free ends of the bowed frame 7 by means of oppositely extending tension springs 21. One end of each of the tension springs is connected to the swinging arm, while the opposite end thereof is adjustably connected to a downwardly extending flange 22 at the extremity of the bowed frame. In the present instance the latter end of the spring is shown as threaded for engagement with an adjusting nut 23 after being passed through an opening in the flange 22. By manipulating these adjusting nuts 23 the tension in the springs 21 can be increased or decreased, as desired, and the action of the two springs is to normally hold the front wheels yieldingly in a position in alinement with the rear wheels.

In the operation of the device, it will be obvious that when the front wheels 3 are swung in either direction to start the machine, the spindle arm connecting rod 5 is moved longitudinally so as to produce a lateral swinging movement of the swinging arm 15. This results in increasing the tension of one of the springs 21 and decreasing the tension of the opposite spring 21, so that as soon as the steering wheel is released the springs will return the front wheels to their original position. This attachment thus renders it unnecessary for the driver to tightly grip the steering wheel at all times, and will tend to reduce the strain upon the driver. The springs will also compensate for looseness in the steering gear and admit of a machine with a loose steering gear being easily and safely driven. The attachment can be quickly placed upon a machine without the necessity of drilling any holes in the frame or altering the construction thereof, and any necessary adjustments of the tension of the springs can be easily and quickly made at any time.

Having thus described the invention, what I claim as new and desire to secure by Letters Patent, is:—

A spring attachment for the steering gear of automobiles, including a bowed frame member, means for securing the back thereof to the axle, a pair of coöperating set screws carried by the bowed frame and engaging the axle at spaced points to hold the bowed frame against rocking, a swinging arm pivotally mounted upon the middle portion of the bowed frame and projecting rearwardly therefrom, opposed tension springs connecting the swinging arm to the ends of the bowed frame, and a loose connection between the swinging arm and the spindle arm connecting rod of the steering gear.

In testimony whereof I have signed my name to this specification in the presence of two subscribing witnesses.

CARL A. PETERSON.

Witnesses:
H. W. PETERSON,
E. J. JOHNSON.

Copies of this patent may be obtained for five cents each, by addressing the "Commissioner of Patents, Washington, D. C."